(12) United States Patent
Zhao et al.

(10) Patent No.: US 10,004,037 B2
(45) Date of Patent: Jun. 19, 2018

(54) CODING-AWARE SCHEME TO MINIMIZE ENERGY CONSUMPTION AND TIME COST

(71) Applicant: Macau University of Science and Technology, Macau (MO)

(72) Inventors: Qinglin Zhao, Macau (MO); Caihong Kai, Hefei (CN); Hanxu Zheng, Hefei (CN)

(73) Assignee: Macau University of Science and Technology, Macau (MO)

( * ) Notice: Subject to any disclaimer, the term of this patent is extended or adjusted under 35 U.S.C. 154(b) by 80 days.

(21) Appl. No.: 15/219,293

(22) Filed: Jul. 26, 2016

(65) Prior Publication Data

US 2017/0026964 A1    Jan. 26, 2017

Related U.S. Application Data

(60) Provisional application No. 62/197,020, filed on Jul. 26, 2015.

(51) Int. Cl.
*G08C 17/00* (2006.01)
*H04W 52/02* (2009.01)
*H04B 17/391* (2015.01)

(52) U.S. Cl.
CPC .... *H04W 52/0219* (2013.01); *H04B 17/3912* (2015.01); *H04W 4/70* (2018.02); *Y02D 70/00* (2018.01); *Y02D 70/22* (2018.01)

(58) Field of Classification Search
CPC ............ H04W 72/0446; H04W 4/005; H04W 52/0219; H04W 72/005; H04W 72/1242; H04J 3/1694
See application file for complete search history.

(56) References Cited

U.S. PATENT DOCUMENTS

| 8,218,522 B2 * | 7/2012 | Sy | H04W 74/04 370/238 |
| 2008/0137620 A1 * | 6/2008 | Wang | H04W 72/0446 370/337 |

(Continued)

OTHER PUBLICATIONS

W. Heinzelman, A. Chandrakasan, and H. Balakrishnan, "Energy-Efficient Communication Protocol for Wireless Microsensor Networks," IEEE 33rd Annual Hawaii International Conference on System Sciences, 2000.

(Continued)

*Primary Examiner* — Abdelnabi O Musa
(74) *Attorney, Agent, or Firm* — Spruson & Ferguson (Hong Kong) Limited

(57) ABSTRACT

The throughput of a wireless network can be boosted by network coding (NC). The present invention combines NC-aware routing and TDMA-based MAC protocol for energy-efficient design in the wireless network, and provides a method thereof. An optimization model, which is a minimum energy consumption model (MECM), is formulated for minimizing the energy consumption for accomplishing a set of flow transmissions. In particular, based on a set of user traffic-flow demands, a NC-aware traffic-flow assignment that minimizes a total energy consumption of packets delivering to meet the user traffic-flow demands is determined. Thereafter, given the optimal flow assignment, a minimum timeslots model (MTM) which leads to a TDMA-based scheduling strategy at the MAC layer is developed. The MTM is to minimize the total number of timeslots required for transmission under a condition that the NC-aware traffic-flow assignment as already determined is accomplishable.

15 Claims, 13 Drawing Sheets

(56) References Cited

U.S. PATENT DOCUMENTS

2010/0296403 A1* 11/2010 Qiu ................. H04W 28/22
  370/252
2015/0372748 A1* 12/2015 Liew ................ H04W 72/1231
  370/315

OTHER PUBLICATIONS

C. K. Toh, "Maximum Battery Life Routing to Support Ubiquitous Mobile Computing in Wireless Ad Hoc Networks," IEEE Communications Magazine, vol. 39, No. 6, pp. 138-147, 2001.

A. S. K. Mammu, A. Sharma, U. Hernandez, et al, "A Novel Cluster-Based Energy Efficient Routing in Wireless Sensor Networks," IEEE 27th International Conference on Advanced Information Networking and Applications (AINA), 2013.

A. Amokrane, R. Langar, R. Boutaba, et al, "A Green Framework for Energy Efficient Management in TDMA-based Wireless Mesh Networks," IEEE 8th International Conference on Network and Service Management, 2012.

R. Ahlswede, N. Cai, S.-Y. R. Li, et al, "Network Information Flow," IEEE Transactions on Information Theory, vol. 46, No. 4, pp. 1204-1216, 2000.

A. Keshavarz-Haddadt, and R. Riedi, "Bounds on the Benefit of Network Coding: Throughput and Energy Saving in Wireless Networks," IEEE 27th Conference on Computer Communications, 2008.

H. Chang, X. Gao, R. Zong, et al, "Energy-Efficient Coding-Aware Routing in Energy-Constrained Wireless Network," IEEE 2010 international Symposium on Intelligent Signal Processing and Communication Systems (ISPACS), pp. 1-4, 2010.

S. Wang, A. Vasilakos, H. Jiang, et al, "Energy Efficient Broadcasting Using Network Coding Aware Protocol in Wireless Ad hoc Network," IEEE International Conference on Communications, pp. 1-5, 2011.

S. Sengupta, S. Rayanchu, and S. Banerjee, "An Analysis of Wireless Network Coding for Unicast Sessions: The Case for Coding-Aware Routing," IEEE 26th International Conference on Computer Communications, pp. 1028-1036, 2007.

S. Katti, H. Rahul, W. Hu, et al, "XORs in the Air: Practical Wireless Network Coding," ACM SIGCOMM Computer Communication Review, vol. 36, No. 4, pp. 243-254, 2006.

J. Liu, D. Goeckel, D. Towsley, "Bounds on the Gain of Network Coding and Broadcasting in Wireless Networks," IEEE 26th International Conference on Computer Communications, pp. 724-732, 2007.

N. Gaddam, S. A. Gathala, D. Lastine, et al, "Energy Minimization Through Network Coding for Lifetime Constrained Wireless Networks," IEEE 17th International Conference on Computer Communications and Networks, 2008.

K. Xiao, Y. Zhang, G. Feng, et al, "eCOPE: Energy Efficient Network Coding Scheme in Multi-Rate Wireless Networks," Wireless Communications and Networking Conference Workshops (WCNCW) 2013, pp. 18-23, 2013.

A. Amokrane, R. Langar, R. Boutabayz, et al, "Online Flow-Based Energy Efficient Management in Wireless Mesh Networks," Global Communications Conference (GLOBECOM) 2013, pp. 329-335, 2013.

R. Wang, Z. Jiang, S. Gao, et al, "Energy-Aware Routing Algorithms in Software-Defined Networks," IEEE 15th International Symposium on a World of Wireless, Mobile and Multimedia Networks (WoWMoM), pp. 1-6, 2014.

D. Couto, D. Aguayo, J. Bickel, et al, "A High Throughput Path Metric for Wireless sensor Routing," Wireless Networks 2005, vol. 11, No. 4, pp. 419-434, 2005.

* cited by examiner

US 10,004,037 B2

CODING-AWARE SCHEME TO MINIMIZE ENERGY CONSUMPTION AND TIME COST

CROSS-REFERENCE TO RELATED APPLICATIONS

This application claims the benefit of U.S. Provisional Patent Application No. 62/197,020, filed on Jul. 26, 2015, which is incorporated by reference herein in its entirety.

BACKGROUND

Field of the Invention

The present invention generally relates to routing and scheduling of a wireless network. In particular, the present invention relates to a technique combining routing and scheduling for energy-efficient design of the wireless network, where network coding is used in routing for energy-efficient communications, and TDMA-based MAC scheduling is used to minimize the total time cost.

List of References

There follows a list of references that are occasionally cited in the specification. Each of the disclosures of these references is incorporated by reference herein in its entirety.

[1] W. Heinzelman, A. Chandrakasan, and H. Balakrishnan, "Energy-Efficient Communication Protocol for Wireless Microsensor Networks," *IEEE 33rd Annual Hawaii International Conference on System Sciences*, 2000.

[2] C. K. Toh, "Maximum Battery Life Routing to Support Ubiquitous Mobile Computing in Wireless Ad Hoc Networks," *IEEE Communications Magazine*, vol. 39, no. 6, pp. 138-147, 2001.

[3] A. S. K. Mammu, A. Sharma, U. Hernandez, et al, "A Novel Cluster-Based Energy Efficient Routing in Wireless Sensor Networks," *IEEE 27th International Conference on Advanced Information Networking and Applications (AINA)*, 2013.

[4] A. Amokrane, R. Langar, R. Boutaba, et al, "A Green Framework for Energy Efficient Management in TDMA-based Wireless Mesh Networks," *IEEE 8th International Conference on Network and Service Management*, 2012.

[5] R. Ahlswede, N. Cai, S.-Y. R. Li, et al, "Network Information Flow," *IEEE Transactions on Information Theory*, vol. 46, no. 4, pp. 1204-1216, 2000.

[6] A. Keshavarz-Haddadt, and R. Riedi, "Bounds on the Benefit of Network Coding: Throughput and Energy Saving in Wireless Networks," *IEEE 27th Conference on Computer Communications*, 2008.

[7] H. Chang, X. Gao, R. Zong, et al, "Energy-Efficient Coding-Aware Routing in Energy-Constrained Wireless Network," *IEEE 2010 international Symposium on Intelligent Signal Processing and Communication Systems (ISPACS)*, pp. 1-4, 2010.

[8] S. Wang, A. Vasilakos, H. Jiang, et al, "Energy Efficient Broadcasting Using Network Coding Aware Protocol in Wireless Ad hoc Network," *IEEE International Conference on Communications*, pp. 1-5, 2011.

[9] S. Sengupta, S. Rayanchu, and S. Banerjee, "An Analysis of Wireless Network Coding for Unicast Sessions: The Case for Coding-Aware Routing," *IEEE 26th International Conference on Computer Communications*, pp. 1028-1036, 2007.

[10] S. Katti, H. Rahul, W. Hu, et al, "XORs in the Air: Practical Wireless Network Coding," *ACM SIGCOMM Computer Communication Review*, vol. 36, no. 4, pp. 243-254, 2006.

[11] J. Liu, D. Goeckel, D. Towsley, "Bounds on the Gain of Network Coding and Broadcasting in Wireless Networks," *IEEE 26th International Conference on Computer Communications*, pp. 724-732, 2007.

[12] N. Gaddam, S. A. Gathala, D. Lastine, et al, "Energy Minimization Through Network Coding for Lifetime Constrained Wireless Networks," *IEEE 17th International Conference on Computer Communications and Networks*, 2008.

[13] K. Xiao, Y. Zhang, G. Feng, et al, "eCOPE: Energy Efficient Network Coding Scheme in Multi-Rate Wireless Networks," *Wireless Communications and Networking Conference Workshops (WCNCW)* 2013, pp. 18-23, 2013.

[14] A. Amokrane, R. Langar, R. Boutabayz, et al, "Online Flow-Based Energy Efficient Management in Wireless Mesh Networks," *Global Communications Conference (GLOBECOM)* 2013, pp. 329-335, 2013.

[15] R. Wang, Z. Jiang, S. Gao, et al, "Energy-Aware Routing Algorithms in Software-Defined Networks," *IEEE 15th International Symposium on A World of Wireless, Mobile and Multimedia Networks (WoWMoM)*, pp. 1-6, 2014.

[16] D. Couto, D. Aguayo, J. Bicket, et al, "A High Throughput Path Metric for Wireless sensor Routing," *Wireless Networks* 2005, vol. 11, no. 4, pp. 419-434, 2005.

Description of Related Art

During recent years, energy-efficient communication in wireless sensor networks has been a hot topic among both industrial and academic communities [1]-[4]. Energy-efficient designs are essential for wireless sensor networks, especially for networks with energy-constraint sensors. The energy consumption of a wireless node in communications mainly consists of three parts: the RF energy cost for packet transmitting and receiving, and the energy cost for packet processing.

It is desirable to minimize the total energy consumption of accomplishing a set of flow transmissions in wireless sensor networks, by adopting the technology of network coding (NC). Specifically, for a wireless network with multiple unicast traffic-flows to be delivered, by carefully assigning the traffic-flow among different paths and exploring the chances of NC, one can reduce the times of packet relaying and transmission, leading to a decreased energy cost.

NC was originally proposed in [5] to boost network throughputs. The key idea is that different from traditional packet relay operations of "store and forward", NC allows the relay node to encode packets before forwarding. Consider a two-way-relay network in FIG. 1. Nodes A and B have packets to exchange with the help of relay node R. If node R performs the simple "store and forward" operation, then four unicast transmissions (Links 1, 2, 3, and 4 in FIG. 1) are required. Thus, the total energy consumption includes four times of packet transmitting and receiving. However, by encoding the packets of nodes A/B and broadcasting the coded packet (Link 5 in FIG. 1), NC only needs three transmissions to accomplish the packet exchange. Thus, with NC the total energy consumption includes three times of packet transmitting and two times of packet receiving.

It is interesting to investigate how the NC technology improves the energy efficiency in wireless networks. Ref. [6] analyzed the benefits of NC in terms of energy efficiency under two scenarios: single multicast session and multiple unicast sessions. Network coding-aware routing refers to the routing protocol which can automatically seek coding opportunities on all available paths.

Among researches on energy-efficient schemes adopting NC, [7] proposed a mechanism by detecting potential coding opportunities under two-hop coding conditions in energy-constrained wireless networks. Ref. [8] combined NC with the connected dominating set and proposed a scheme to reduce energy consumption in Ad Hoc networks. Ref. [1] proposed LEACH that utilizes randomized rotation of local cluster base stations to evenly distribute the energy load among the sensors in the network. A new power-aware routing protocol was presented in [2] to maximize the lifetime of wireless node and minimize overall transmission power for each connection request. Ref. [3] proposed a cluster based energy efficient routing algorithm (CBER) that elects cluster head based on nodes near to the optimal cluster head distance and residual energy of the nodes. Ref. [4] proposed a new framework for energy management in time division multiple access- (TDMA-)based wireless mobile networks (WMNs) to support energy efficient communications. However, the above routing schemes did not take the benefits brought by NC into account.

The first implementation of NC in real wireless networks, COPE, was proposed in 2006 to achieve higher unicast throughput for wireless sensor networks [10]. However, COPE simply seeks for coding opportunities in single hop, which greatly limits the performance of NC. Ref [9] analyzed the throughput benefits brought by NC from a centralized perspective, and discussed the tradeoff between wireless interference and coding opportunities. Ref. [11] proved that the energy gain is upper bounded by 3. Ref. [12] analyzed the energy minimization for lifetime constrained wireless networks and the tradeoff between coding opportunities and network lifetime. Ref [13] showed that in multi-rate wireless networks seeking more coding opportunities without exploiting multi-rate feature may lead to selecting low-rate links for transmission and thus compromise the performance gain and energy-efficient brought by NC.

Recently, centralized analysis and designed schemes also attracts much attention. Ref [14] proposed a new framework and an online flow-based routing approach to support energy-efficient management in wireless mesh networks. Ref. [15] proposed two algorithms to minimize the power of integrated chassis and linecards that are used while putting the idle ones into sleep under constraints of link utilization and packet delay.

Although there have been existing techniques for NC-aware routing, it is advantageous to have a novel technique improved over existing ones in further energy reduction and further reduction in time costs. There is a need in the art for such improved technique.

SUMMARY OF THE INVENTION

In this work, an energy efficient coding-aware scheme (EECAS) is developed. The EECAS provides a novel energy efficient scheme that includes a NC-aware traffic-flow assignment and a TDMA-based media access control (MAC) scheduling strategy. To the best of the inventors' knowledge, this work is the first attempt to combine NC-aware routing and TDMA-based MAC protocol for energy-efficient design in wireless sensor networks.

The present invention is developed based on the EECAS. An aspect of the present invention is to provide a method for scheduling packet transmission among plural nodes. The nodes employ two-way packet relaying in communication among themselves.

The method comprises a step of, based on a set of user traffic-flow demands, determining a NC-aware traffic-flow assignment for routing the packet transmission among the nodes in the presence of NC. In particular, the NC-aware traffic-flow assignment minimizes a total energy consumption of all the nodes in delivering packets to meet the user traffic-flow demands. The method further comprises a step of determining a TDMA-based MAC schedule that minimizes a total number of timeslots required by all the nodes for transmitting the packets while accomplishing the NC-aware traffic-flow assignment.

Other aspects of the present invention are disclosed as illustrated by the embodiments hereinafter.

DETAILED DESCRIPTION

Figure 1:
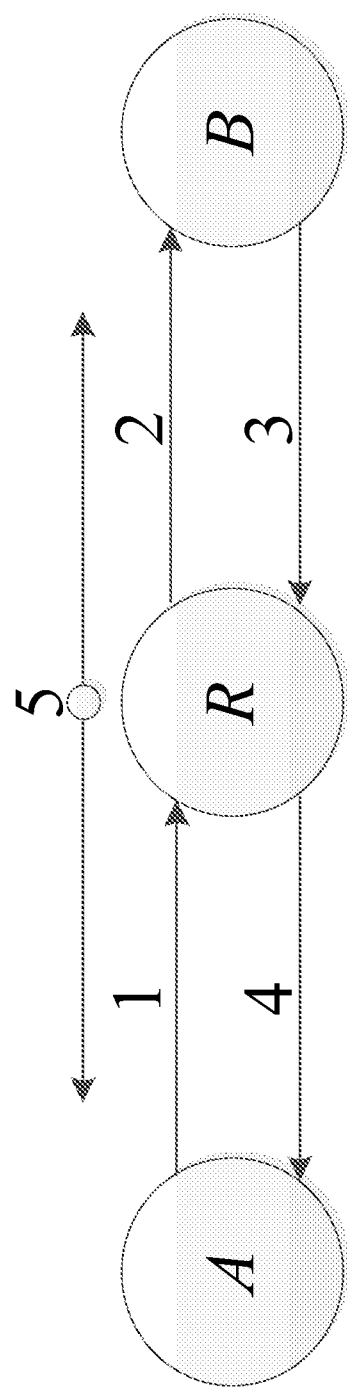
FIG. 1 is an example of a network having a two-way relay structure, the example being used for illustrating the disclosed routing method.

With the basic idea of improving energy-efficiency of wireless sensor networks by exploring NC opportunities, the present invention provides an EECAS for a wireless network such as a wireless sensor network. Based on the NC-aware routing analytical framework proposed in [9], we first formulate an optimization model, which is called as a minimum energy consumption model (MECM), to minimize the energy consumption for accomplishing a set of flow transmissions. Thereafter, given the optimal flow assignment of the MECM, we provide a minimum timeslots model (MTM), which leads to a TDMA-based scheduling strategy at the MAC layer.

Specifically, the EECAS comprises the following two procedures.

Procedure 1: Given a specific network topology and a set of user traffic-flow demands, we formulate an optimization model, the MECM, in which the objective function is to minimize the total energy consumption of packets delivering to meet the user demands, and the constraints are given by NC rules, the flow balance on nodes, and so on. By solving the model, we can obtain an optimal NC-aware traffic-flow assignment.

Procedure 2: Given the traffic-flow assignment in Procedure 1, we design an optimal TDMA-based MAC scheduling strategy to fulfill the flow transmissions. Specifically, we formulate an optimization model, viz., the MTM with the target of minimizing total timeslots.

The main thrust of our work is that we combine the NC-aware routing and TDMA-based MAC protocol to develop an energy efficient scheme, in which we explore the network-coding opportunities to reduce energy consumption. By adopting the first order radio model [1], the energy consumption of accomplishing a set of flow transmissions can be computed and then minimized. Simulation results validate the performance of EECAS in terms of both energy efficiency and time cost.

It is worthwhile to note that EECAS can be implemented under the framework of software-defined network, which is a promising network architecture that decouples the control and data planes to provide an intelligent approach for future wireless networks.

A. Basic Concepts and Notations

Our target is to minimize the overall energy consumption of all nodes for accomplishing multiple unicast traffic-flow demands in a wireless sensor network, by introducing the technique of NC. We first present some basic concepts and notations in this section.

A.1 First Order Radio Model

According to the first order radio model [1], the energy consumption of a wireless node mainly consists of three parts: RF energy cost for packets transmitting ($E_{sd}$), packets receiving ($E_{re}$) and energy cost for packets processing ($E_{cd}$):

$$E_{sd}(k,d)=E_e \times k + E_a \times k \times d^2 \qquad (1)$$

$$E_{re}(k)=E_e \times k \qquad (2)$$

$$E_{cd}(k)=E_c \times k \qquad (3)$$

where $E_e$ (unit: nJ/bit) denotes the radio energy consumption for each bit of the transmitter or receiver circuit, $E_a$ (unit: nJ/bit/m$^2$) denotes energy consumption for each bit of the transmit amplifier and $E_c$ (unit: nJ/bit) denotes the energy consumption for packets processing (i.e. packets coding) of each bit. In (1)-(3), k denotes the amount of traffic delivered, and d is the transmission distance.

Note that in the transmission of the network-coded packets, the parameter of transmission distance d is equal to the maximum distance of two unicast links. In addition, the amount of traffic k in transmitting and receiving includes both the unicast and the broadcast packets.

A.2 Network Coding Rule

The EECAS only considers the two-way-relay coding structure as shown in FIG. 1. In general, if a node has n adjacent links, there exist at most $C_n^2$ coding opportunities.

A.3 Wireless Interference and Feasible States

Figure 2:
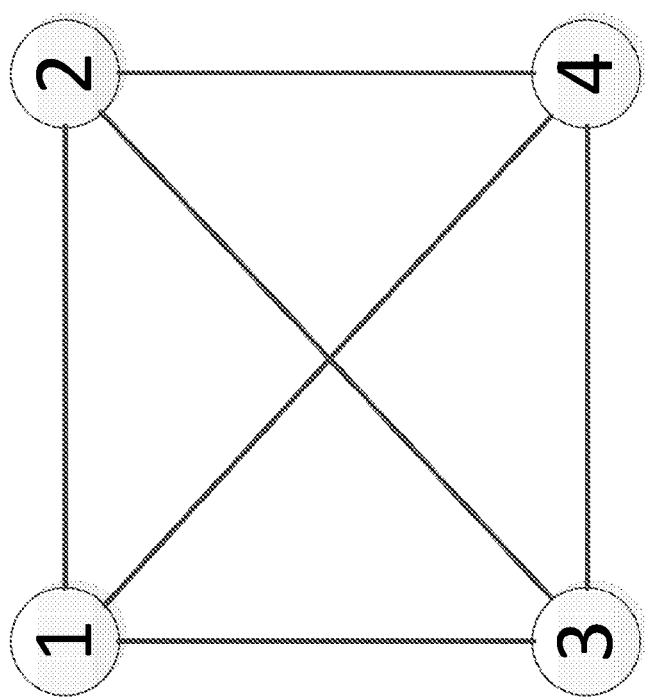
FIG. 2 is a conflict graph G of the network of FIG. 1.

We use a conflict graph G=(V,E) to describe the wireless interference of a wireless sensor network. Each link (i.e. a transmitter and receiver pair) is modeled as a vertex j∈V. Edges, on the other hand, model the wireless interference relationships among the links. An edge e∈E between two vertices means that they are within interference range of each other and could not be active simultaneously. FIG. 2 shows the conflict graph of the network of FIG. 1, where links 1, 2, 3, 4 interfere with each other. It is worthwhile to note that the reverse direction of one link between two nodes is considered as another link in our model.

Figure 3:
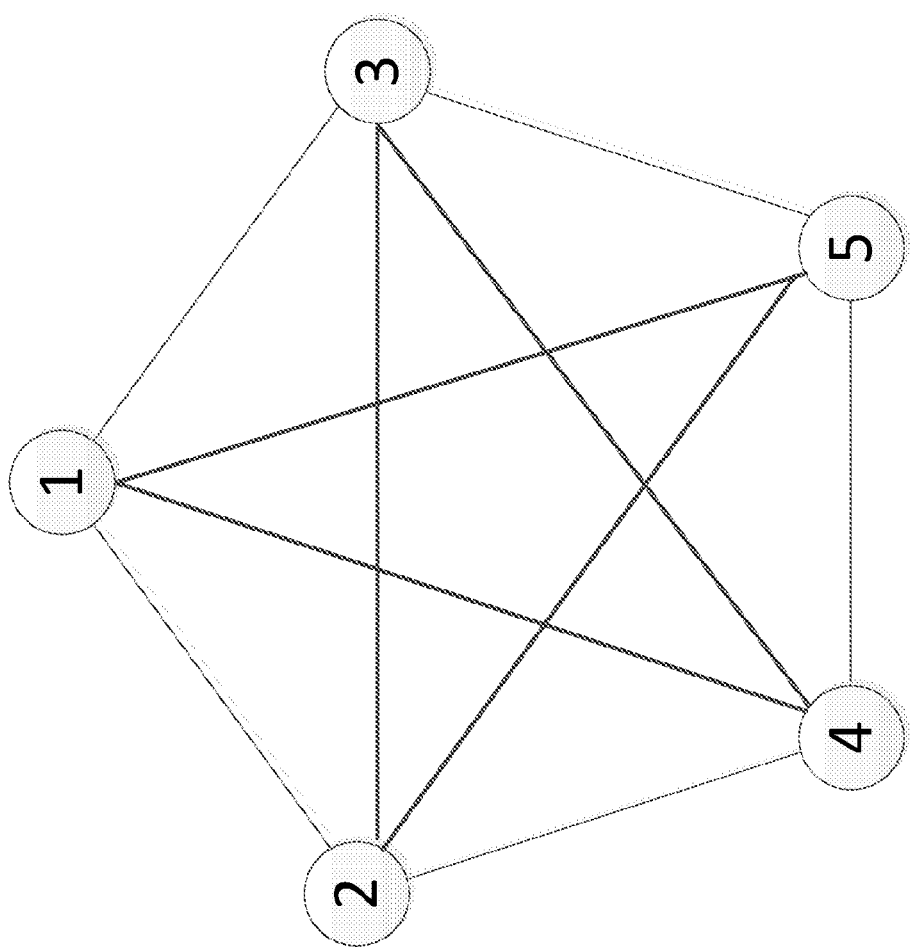
FIG. 3 is a conflict graph $G_b$ with broadcast links of the network of FIG. 1.

Note that NC requires a broadcast link, we next introduce the concept of conflict graph $G_b=(V_b,E_b)$ with broadcast links to describe the interference relationships among both unicast and broadcast links. In the expression, $V_b$ denotes the set of both unicast and broadcast links, and $E_b$ denotes the edge set between links. It is easy to see that in $G_b$ we can treat a broadcast link as an extra unicast link from the perspective of channel competition. FIG. 3 shows the conflict graph with broadcast links of the network shown in FIG. 1, in which an extra node, link 5 is added to reflect the network-coded broadcast transmission, and links 1, 2, 3, 4, 5 interfere with each other.

In a TDMA-based scheduling scheme, time is divided into timeslots that are assigned to feasible states of the network. Given the conflict graph with broadcast links of the network, the feasible states are the independent sets of the conflict graph. Let $s_j \in \{0,1\}$ denote the state of link j, where $s_j=1$ if the link j is active (transmitting) and $s_j=0$ if the link j is idle. The feasible state of the overall network can be denoted by $s=s_1 s_2 \ldots$ Note that $s_j$ and $s_k$ cannot both be 1 simultaneously if links j and k are within an interference range with each other. Let S denote the set of all feasible states and $t_s$ denotes the timeslots assigned to state s.

Table I lists some of notations used in this work.

TABLE I

Notations used herein.

| Notation | Definition |
| --- | --- |
| K | Demand k |
| D | Demands set |
| N | Nodes set |
| o(k) | Source node of demand k |
| w(j) | Transmitting node of link j |
| $R^k$ | Set of available paths for demand k |
| $u_R^k$ | Amount of traffic on path R for demand k |
| $q_k$ | Amount of traffic for demand k |
| $\bar{j}$ | Reverse link of link j |
| $E^+(i), E^-(i)$ | Sets of incoming and outgoing links of node i |
| $m_i^j, m_i^{\{j_1, j_2\}}$ | Transmitting traffic at node i on link j and $\{j_1, j_2\}$ |
| $d_j$ | Transmitting distance of link j |
| $E_i$ | Total energy consumption of node i |
| $t_s$ | Timeslot of feasible state s |
| $v_j$ | Transmitting rate of link j |

B. Energy Efficient Coding-Aware Scheme

We next present our energy efficient coding-aware schemes including the MECM and the MTM. Specifically, we first formulate the target of minimizing energy consumption as the detailed objective functions. Afterward, we construct an optimization model, the MECM, to obtain an optimal traffic-flow assignment. According to this assignment, another optimization model, the MTM, is built up to obtain a TDMA-based MAC scheduling strategy. Finally, this energy efficient scheme is formed to accomplish all user traffic-flow demands.

B.1 Problem Formulation

Consider a general wireless sensor network in which there are z unicast user traffic-flow demands and each demand is to transmit certain amount of data from one node to another. For instance, demand k is to transmit traffic of amount $q_k$ from node a to node b. To accomplish all demands with the minimum consumed energy, the objective function is $$F = \min(\Sigma E_i), \forall i \in N \quad (4)$$

where $E_i$ denotes the energy consumption of node i, and $\Sigma E_i$ is the total energy consumption of all nodes in the network.

For each user demand k, we need to select available paths from source node to destination node based on routing metrics such as ETX [16], and in this way we can avoid adopting paths with low efficiency beforehand.

The following sections describe the detailed two steps of achieving energy efficient scheme by two models: the MECM and the MTM.

B.2 MECM-Minimum Energy Consumption Model

The EECAS targets to minimize the total energy consumption in wireless sensor network given user traffic-flow demands and network conditions. We next formulate the following optimization problem:

Objective function ①:

$$F = \min(\Sigma E_i) \; \forall \, i \in N \quad (5)$$

subject to $$\sum_{R \in R^k} u_R^k = q_k \; \forall \, k \in D, \quad (6)$$

$$m_i^{\{j_1,j_2\}} \le \sum_{k \in D} \sum_{R \in R^k, j_2 j_1 \in R} u_R^k \; \forall \, j_1, j_2 \in E^+(i), i \in N, \quad (7)$$

$$m_i^{\{j\}} = \sum_{k \in D, o(k)=i} \sum_{R \in R^k, j \in R} u_R^k + \sum_{j_1 \in E^-(i)} \left[ \sum_{k \in D} \sum_{R \in R^k, j_1 j \in R} u_R^k - m_i^{\{j, \overline{j_1}\}} \right] \quad (8)$$

$$\forall \, j \in E^+(i), i \in N,$$

$$E_i = E_{i(sd)} + E_{i(re)} + E_{i(cd)} \; \forall \, i \in N, \quad (9)$$

$$E_{i(sd)} = \sum_{j \in E^+(i)} (E_e + E_a \cdot d_j^2) \times m_i^j + \sum_{\{j_1,j_2\} \in E^+(i)} (E_e + E_a \cdot \max(d_{j_1}, d_{j_2})^2) \times m_i^{\{j_1,j_2\}} \quad (10)$$

$$\forall \, j \in E^+(i), \forall \{j_1, j_2\} \in E^+(i), i \in N,$$

$$E_{i(re)} = E_e \cdot \left( \sum_{j \in E^-(i)} m_{i_1:i_1 \in w(j)}^{\{j\}} + \sum_{j_1|j_2 \in E^-(i)} m_{i_2:i_2 \in w(j_1), w(j_2)}^{\{j_1,j_2\}} \right) \quad (11)$$

$$\forall \, j \in E^-(i), \forall \{j_1, j_2\} \in E^-(i), i \in N,$$

and $$E_{i(cd)} = E_c \cdot \left( \sum_{(j_1,j_2) \in E^+(i)} m_i^{\{j_1,j_2\}} \right) \; \forall \{j_1, j_2\} \in E^+(i), i \in N. \quad (12)$$

EQN. (6) denotes the total traffic of demand $k \in D$ distributed over all available paths $R^k$ must be equal to traffic amount $q_k$. EQN. (7) determines the maximum amount of coded traffic $m_i^{\{j_1,j_2\}}$ that can be broadcast on outgoing links $\{j_1, j_2\}$ should be less than total incoming traffic on link $\overline{j_1}j_2$ or $\overline{j_2}j_1$ at node i. EQN. (8) denotes the total amount of traffic $m_i^{\{j\}}$ that is unicast on outgoing link j at node i can be divided into two parts: traffic that originates at node i with outgoing link j and traffic of incoming node i with outgoing link j that could not be coded. EQNS. (9)-(12) are definitions of energy consumption according to first order radio model.

EQN. (10) denotes the total energy consumption $E_{i(sd)}$ in transmitting packets at node i includes both unicast and broadcast transmission. In broadcast transmission, the parameters of transmission distance must be equal to max $(d_{j_1}, d_{j_2})$. EQN. (11) denotes that the total energy consumption $E_{i(re)}$ in receiving packets at node i includes both the unicast and broadcast received. EQN. (12) denotes energy consumption of packets coding.

B.3 Analysis of Benefit Brought by Network Coding

We next analyze the interactions between the benefits in terms of energy consumption and the coding opportunities in MECM.

As mentioned above, NC may reduce energy consumption in a two-way-relay packet exchange process. More specifically, one time of energy consumption of packet transmitting is reduced while one time of energy consumption of packet coding is added. Thus, the reduction of energy consumption $E_b$ brought NC in a two-way-relay packets exchange could be denoted by $$E_b = E_e \times k + E_a \times k \times d^2 - E_c \times k. \quad (13)$$

EQN. (13) shows that one bit of packet coding could reduce $E_e + E_a \times d^2 - E_c$ unit of energy.

Table II lists the typical parameters setting in the first order radio model. It is easy to see that one bit of coded traffic could reduce 55 nJ of energy consumption for a broadcast with transmitting distance of 10 m. With more coding opportunities in a large-scale wireless network, NC could bring higher energy-efficiencies. Thus in MECM, the target of minimizing total energy consumption is equivalent to the target of maximizing coding opportunities.

TABLE II

Parameters Setting

| Parameter | Setting |
|---|---|
| $E_e$: energy consumption for the transmitter or receiver circuitry | 50 nJ/bit |
| $E_a$: energy consumption for the transmit amplifier | 100 pJ/bit/m2 |
| $E_c$: energy consumption for packet coding | 5 nJ/bit |

By solving the MECM, we obtain an optimal traffic-flow assignment $m_i^j$. However, without a MAC protocol it is still not enough to form a complete energy-efficient scheme. The following TDMA-based scheduling strategy is proposed for this purpose.

B.4 MTM—Minimum Timeslots Model

At the MAC layer, we divide time into timeslots and introduce a TDMA-based MAC protocol to fulfill a complete energy efficient scheme by minimizing the total time cost while accomplishing the traffic-flow assignment generated by the MECM.

Let $v_j$ denote the effective transmission rate of link j. The timeslot for link j to accomplish its own traffic demand $m_i^j$ is $m_i^j/v_j$. It is easy to see that the total timeslots for link j to transmit $m_i^j$ amount of data should be equal to the total timeslots assigned to the feasible states in which it is active. Here, we minimize the total time cost of all feasible states while accomplishing all traffic $m_i^j$ of each link j. We formulate the optimization problem:

Objective function ②:

$$F = \min \sum_{s \in S} t_s \quad (14)$$

subject to $$\frac{m_i^j}{v_j} = \sum_{s:s_j=1} t_s \ \forall \ j \in V_b \quad (15)$$

where $(s:s_j=1)$ represents the feasible state where $s_j=1$.

The effective transmission rate of broadcast link pair $\{j_1,j_2\}$ satisfies a condition $v_{\{j_1,j_2\}}=\min(v_{j_1},v_{j_2})$ due to the broadcast nature.

Both the MECM and the MTM are linear and can be solved by using standard optimization tools.

C. Performance Evaluation

Figure 4:
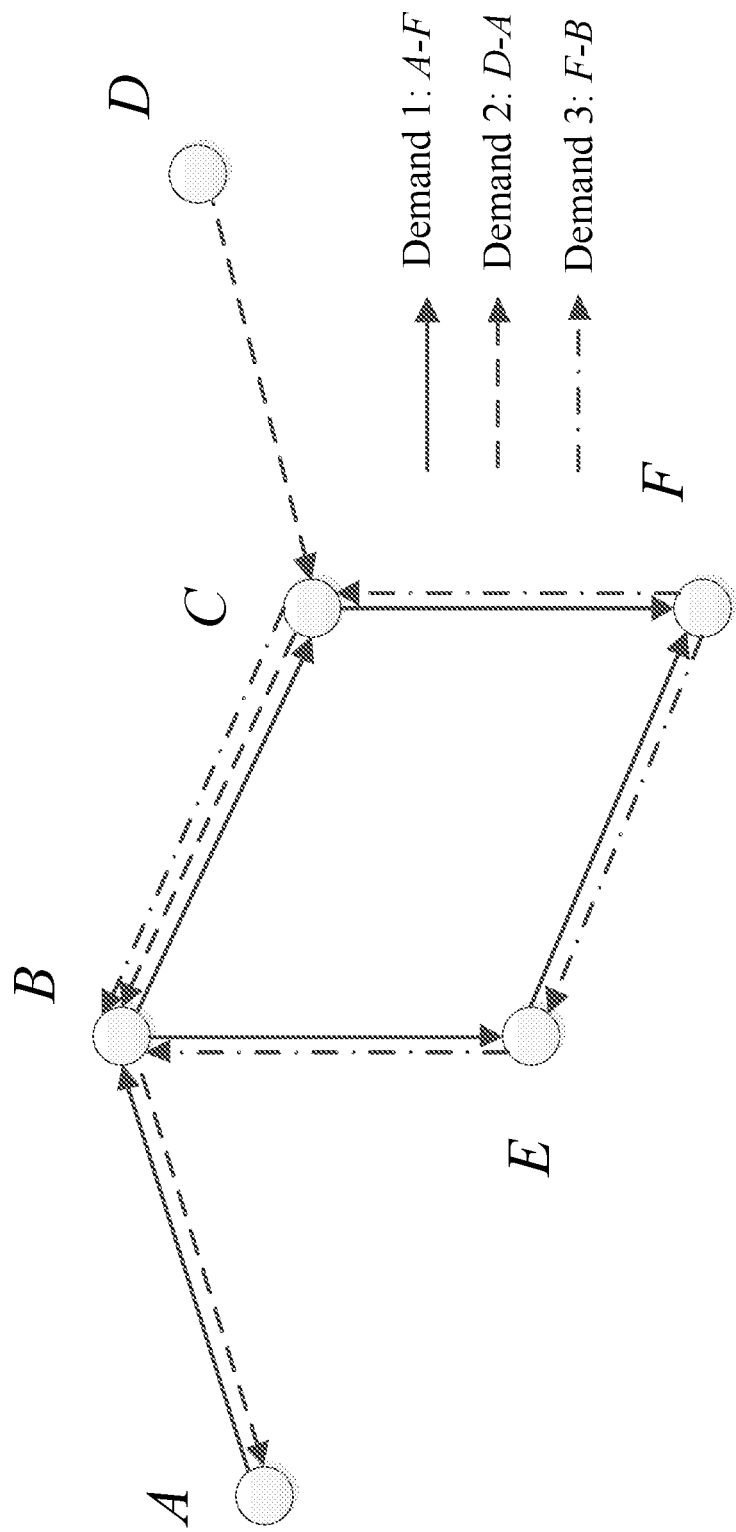
FIG. 4 is a 6-node wireless network with three traffic demands, the network being used to obtain simulation results for evaluating the performance of the disclosed routing scheme.

We next evaluate the performance of EECAS in terms of both energy efficiency and time cost. We consider a 6-node wireless network as shown in FIG. 4. Each link between adjacent nodes represents a communication pair. Three user traffic-flow demands exist as follows: ① node A→node F; ② node D→node A; ③ node F→node B. All available paths based on the shortest path of each demand is shown in the figure. In this network scenario, NC opportunities exist at node B, C, E. The NC incurred broadcast link of node B corresponds to B→A/C; the broadcast link of node C corresponds to C→B/F; the broadcast link of node E corresponds to E→B/F. The distance between all adjacent nodes is 10 meters, and the transmission rate of all links is equal. The IEEE 802.11b protocol with the transmission rate of 11 Mbps is adopted in our simulation. The interference relationship of this network is that one link is within interference range with another link only if they contain one same node. For instance, link A-B is within interference range with link B-C, while link A-B is without interference range with link C-D.

The traffic amount of the three demands are denoted by x, y, z. First, we use a set of random values to demonstrate the routing strategy generated by the EECAS. Let (x, y, z)=(40, 20,30) (unit: Mb). By the MECM, the total energy consumption on all nodes is 24.75 J under the optimal traffic assignment. Tables III and IV list the amount of coded traffic and the assignment of traffic-flow among different paths.

TABLE III

Amount Of Coded Traffic

| | Broadcast link B→A/C | Broadcast link C→B/F | Broadcast link E→B/F |
|---|---|---|---|
| Amount of Coded traffic | 30 Mb | 15.79 Mb | 4.21 Mb |

TABLE IV

Distribution of Traffic Flow in Different Paths

| Demand ① | | Demand ② | Demand ③ | |
|---|---|---|---|---|
| Path1: A-B-C-F | Path2: A-B-E-F | Path: D-C-B-A | Path1: F-C-B | Path2: F-E-B |
| 32.65 Mb | 7.35 Mb | 30 Mb | 15.79 Mb | 4.21 Mb |

By the MTM we can obtain the amount of traffic $m_i^j$ of each link and the timeslots $t_s$ assigned to each feasible state, leading to an optimal energy efficient scheme that minimizes the total energy consumption. The detailed statics are omitted here due to limited space.

In order to validate the benefits of the EECAS, we compare the performance of the following three routing schemes in terms of both energy efficiency and time cost.

(a) CR (Common Routing)
(b) CAR (Coding-Aware Routing)
(c) EECAS (Energy-Efficient Coding-Aware Scheme)

CR refers to as the common routing without NC. CAR refers to the traditional coding aware routing [9] that aims at maximizing network throughputs. We next conduct two sets of experiments to investigate the performance of the three algorithms. The amount of total coded traffic refers to the sum of all coded traffic in each node.

C.1 Results for the First Simulation Environment

In the first simulation environment, x ranges from 1-50, y=20, z=30 (unit: Mb). Simulation results are shown in FIGS. 5-8.

Figure 5:
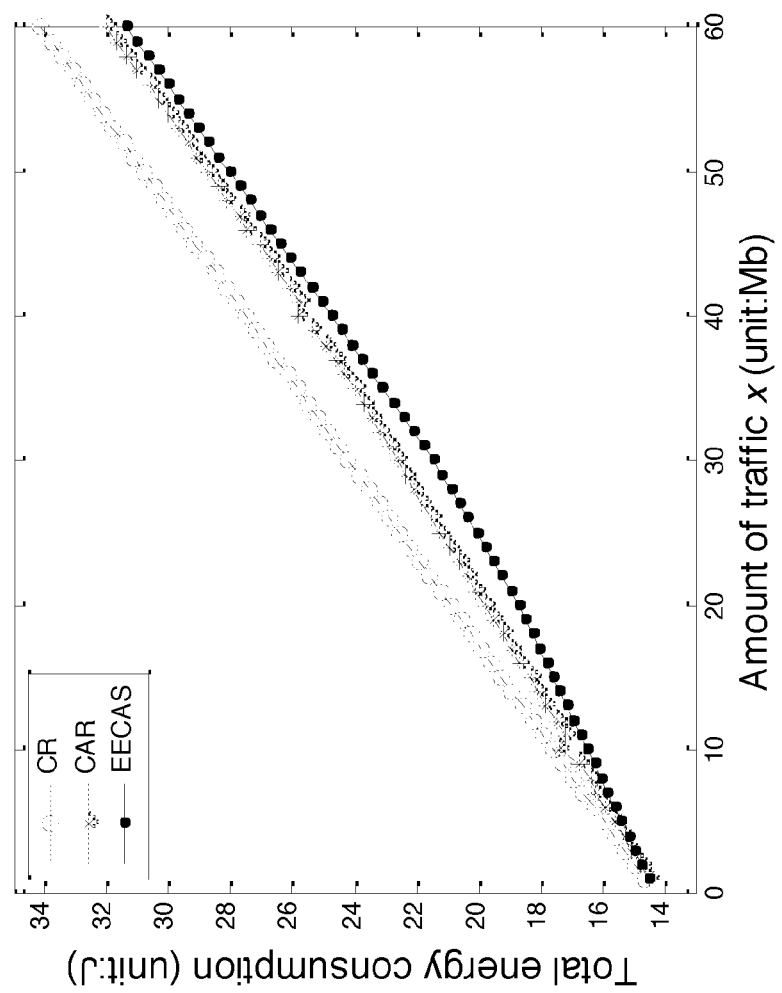
FIG. 5 shows the total energy consumption against the amount of traffic demand x according to simulation results of the first environment.
Figure 6:
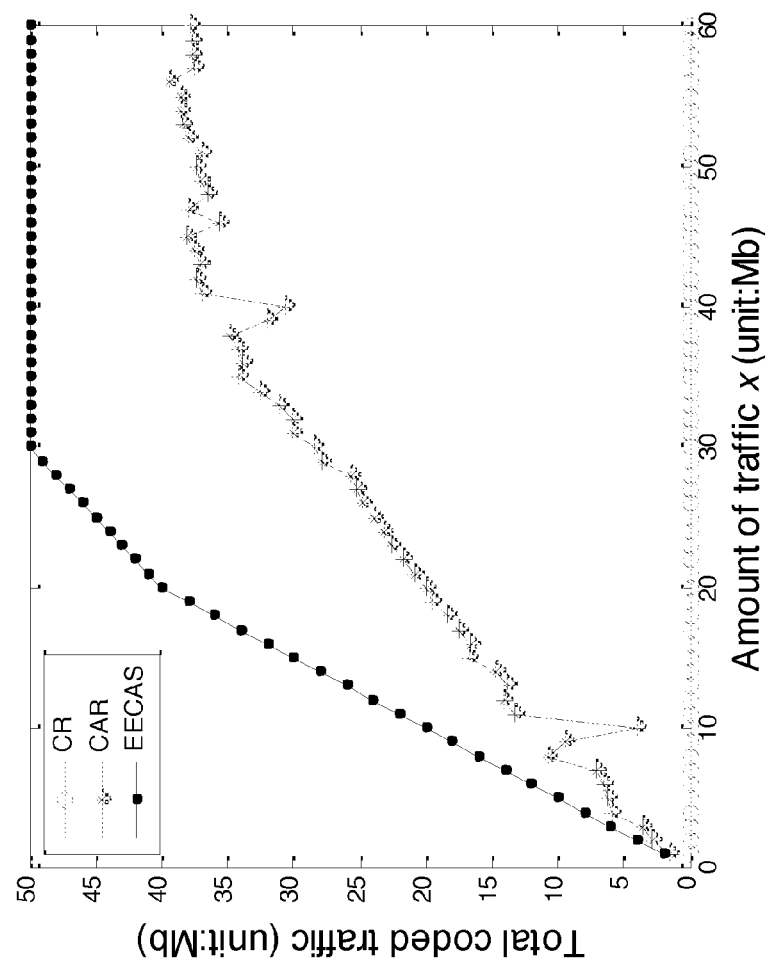
FIG. 6 shows the total coded traffic against the amount of traffic demand x according to simulation results of the first environment.
Figure 7:
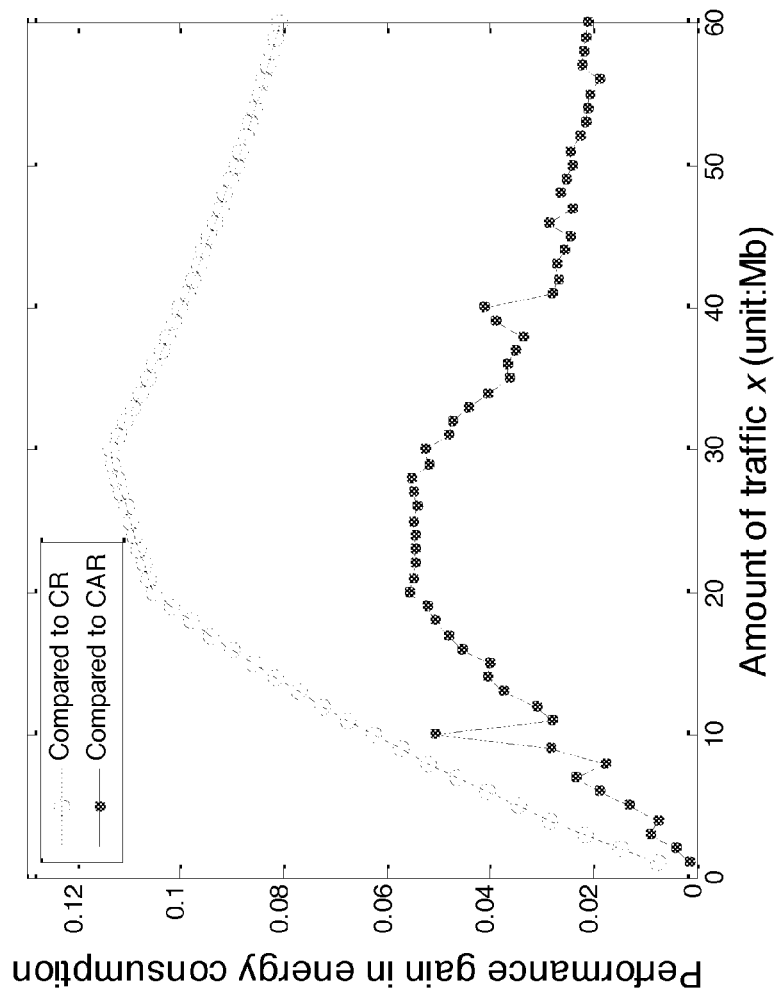
FIG. 7 shows the performance gain against the amount of traffic demand x according to simulation results of the first environment.
Figure 8:
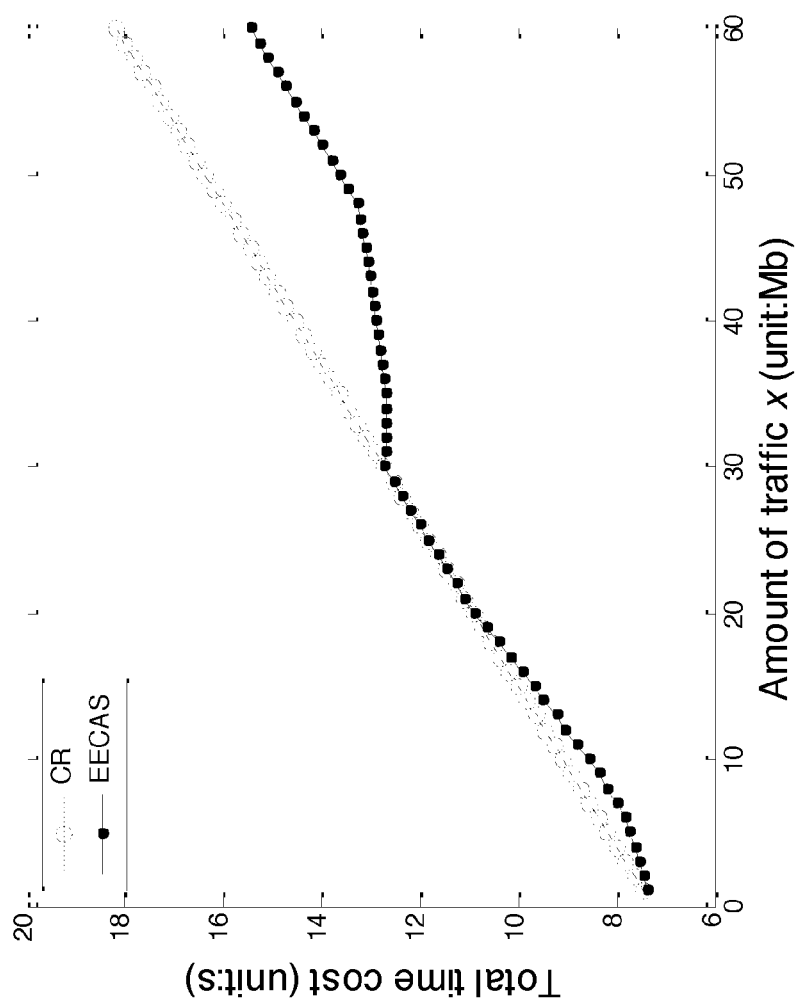
FIG. 8 shows the total time cost against the amount of traffic demand x according to simulation results of the first environment.
Figure 9:
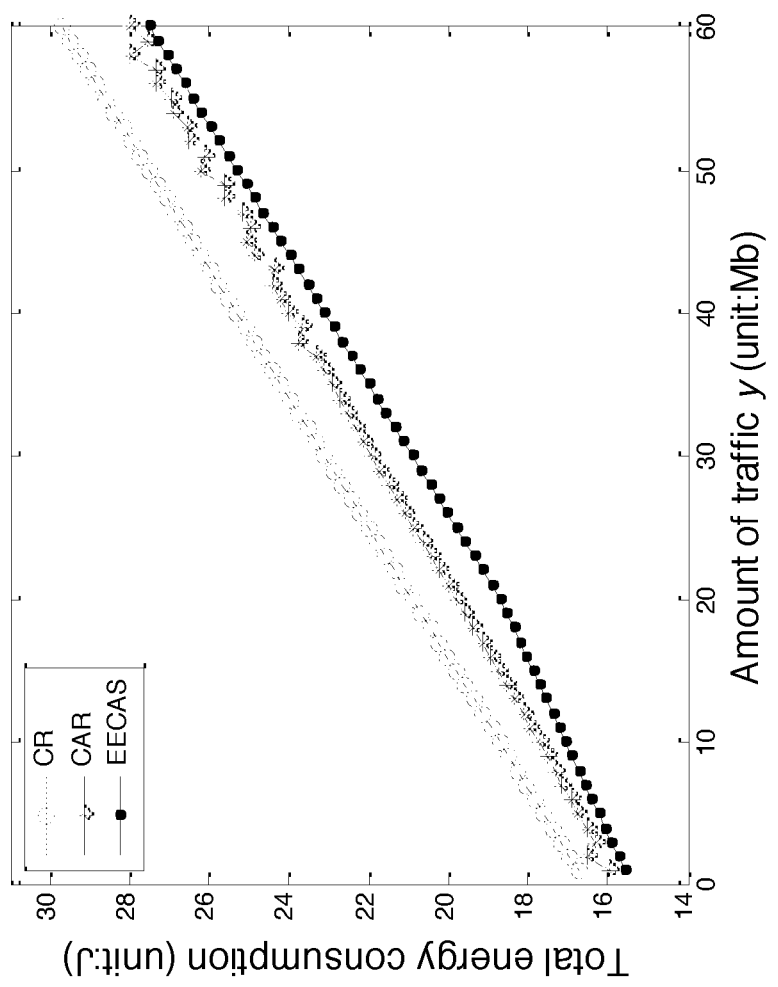
FIG. 9 shows the total energy consumption against the amount of traffic demand y according to simulation results of the second environment.
Figure 10:
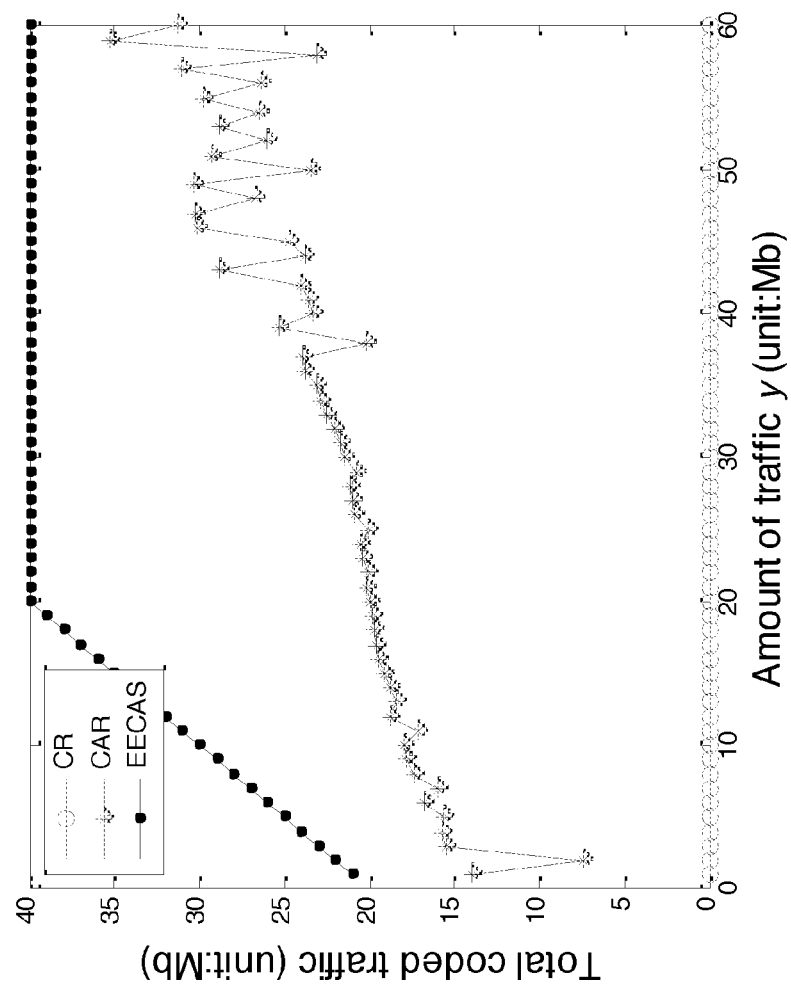
FIG. 10 shows the total coded traffic against the amount of traffic demand y according to simulation results of the second environment.
Figure 11:
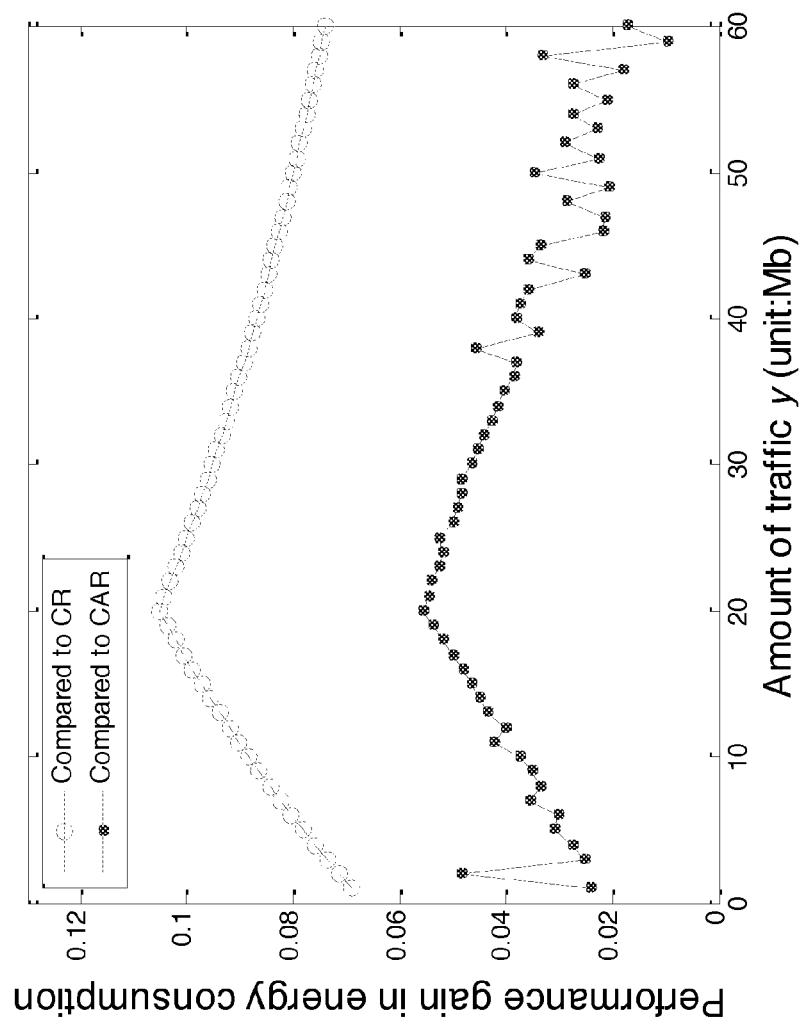
FIG. 11 shows the performance gain against the amount of traffic demand y according to simulation results of the second environment.

FIG. 5 shows the total energy consumption of three routing schemes with variation of x. The EECAS costs the least energy compared to CR and CAR. FIG. 6 shows the total coded traffic in all nodes. Obviously, the total coded traffic of CR is zero without NC. The amount of coded traffic of the EECAS rises with the increase of x and reaches the maximum amount of 50 Mb when x=30. Traffic of demand 1 could be coded with traffic of demand 2 and 3, while traffic of demand 2 and 3 could not be coded with each other. Thus when x=30 Mb, traffic of demand 1 all transmits through path A-B-C-F and traffic of demand 3 all transmits through path F-C-B. Thus traffic of demand 1 could be coded twice: coded with traffic of demand 2 at node B with amount of 20 Mb and coded with traffic of demand 3 at node C with amount of 30 Mb. CAR has less coded traffic compared to the EECAS. FIG. 7 shows the performance gain in energy consumption of the EECAS. The EECAS reduces at most 11% of energy compared to CR, and 6% compared to CAR when the performance gain brought by NC reaches the top when x=30.

We also compare the total time cost of CR and EECAS. Note that using NC could bring two opposite effect on the total time cost of EECAS. The first aspect is that NC itself could effectively reduce time cost as shown in FIG. 1. The second aspect is that the greedy pursuit of maximizing coding opportunities and does not consider the tradeoff between wireless interference and coding opportunities would conversely cause link blocking and throughput degradation. The total time cost of EECAS is determined by these two aspects. From FIG. 8, we can see that the EECAS actually costs less time than CR in general. It is because the positive effect of NC always exists when x ranges from 1-60. On the other hand, when x ranges from 1-30, the negative effect of using NC has great influence. When x ranges from 30-60, no more coding opportunities increases thus the negative effect of NC is weakened.

C.2 Results for the Second Simulation Environment

The second simulation environment: y ranges from 1-60, x=20, z=30 (unit: Mb). Simulation results are shown in FIGS. 9-12.

Figure 12:
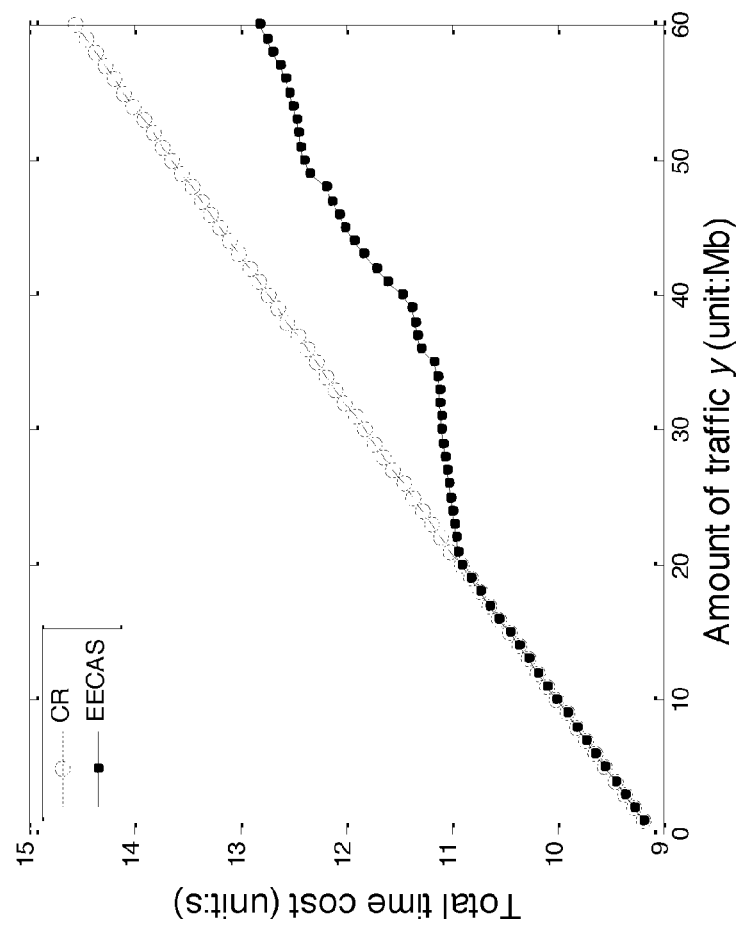
FIG. 12 shows the total time cost against the amount of traffic demand y according to simulation results of the second environment.

The total energy consumption with variation of y is similar to FIG. 5. The difference is that the starting point of three protocols may not coincidence as in FIG. 5, because there already exists NC when y=0. Likewise, the starting point of FIG. 10 does not start from original point. The total coded traffic reaches 40 Mb when y=20 as 20 Mb traffic of demand 1 is coded twice in node B, C. FIG. 12 shows the performance gain in energy consumption. Similarly, EECAS reduces at most 11% of energy compared to CR and 6% compared to CAR when the performance gain brought by NC reaches the top when y=20.

The total time cost with variation of y can be seen in FIG. 12. When y ranges from 1-20, the time cost of CR and EECAS is equal. As explained in FIG. 8, when y ranges from 1-20, the negative effect of using NC has great influence. When y ranges from 20-60, no more coding opportunities increases thus the negative effect of NC is weakened and the curve tends to be gentle.

From the simulation results above we can see that the EECAS costs much less energy than CR and CAR which indicates that coding opportunities brings distinct benefit in energy consumption. The EECAS can reduce at most 11% of energy consumption compared to CR and at most 6% compared to CAR in the network. Moreover, the EECAS can effectively reduce total time cost compared to CR due to NC.

D. The Present Invention

An aspect of the present invention is to provide a method for scheduling packet transmission among plural nodes in a wireless network. In particular, the method is based on the EECAS as disclosed above.

Figure 13:
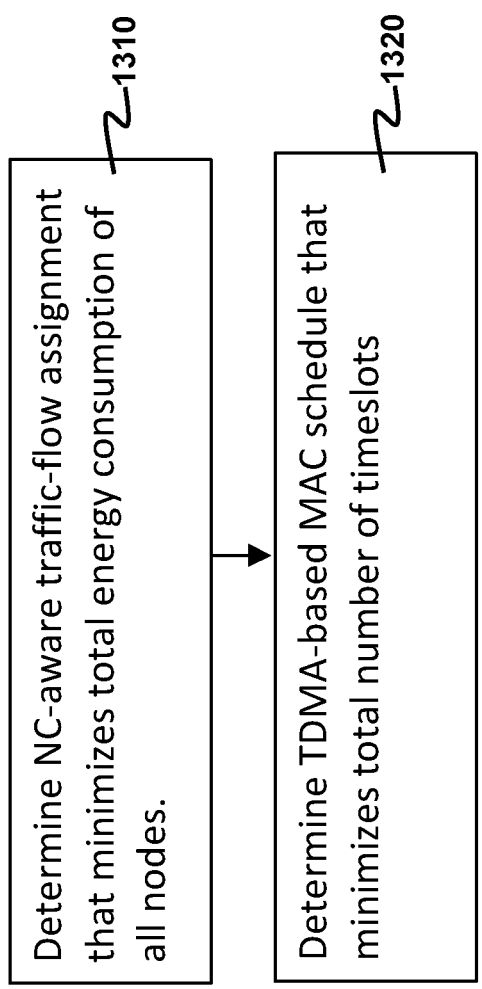
FIG. 13 depicts the steps for scheduling packet transmission according to an exemplary embodiment of the present invention.

The method is exemplarily illustrated as follows with the aid of FIG. 13, which depicts the method steps according to an exemplary embodiment of the present invention. Based on a set of user traffic-flow demands, a NC-aware traffic-flow assignment for routing the packet transmission among the nodes in the presence of NC is determined in a step 1310. In particular, the NC-aware traffic-flow assignment minimizes a total energy consumption of all the nodes in delivering packets to meet the user traffic-flow demands. Thereafter, a TDMA-based MAC schedule is determined in a step 1320. The schedule minimizes a total number of timeslots required by all the nodes for transmitting the packets while accomplishing the NC-aware traffic-flow assignment. The determined schedule provides a scheme for scheduling the packet transmission among the nodes.

In general, each of the nodes is implemented with one or more computing processors for realizing computing and control functions. Preferably, the NC-aware traffic-flow assignment for the nodes is determined by numerically minimizing an objective function representing the total energy consumption of the nodes under a plurality of constraints. The plurality of constraints includes a first constraint that a total energy consumption in transmitting and receiving packets at any node i includes amounts of energy consumed in unicast transmission and in broadcast transmission. Other constraints may be included in the plurality of constraints and are given in Section B.2 above.

In one embodiment, the objective function is provided by (5) and the plurality of constraints is a set of equations given by (6)-(12).

Preferably, the TDMA-based MAC schedule is determined by finding a state $s=s_1 s_2 \ldots$ in S such that $t_s$ subject to a constraint given by (14) is minimum over all the feasible states in S.

The disclosed method is implementable in a wireless network comprising plural nodes. The nodes are collectively configured to employ two-way packet relaying in communication among the nodes, and to schedule packet transmission among the nodes according to any of the embodiments disclosed herein.

The method is particularly advantageous for use in a wireless sensor network. In the wireless sensor network, each of the nodes is a sensor for performing a certain kind of sensing or measurement, and the sensor is further configured to be wirelessly communicable with another sensor in the network.

The embodiments disclosed herein may be implemented using general purpose or specialized computing devices, computer processors, or electronic circuitries including but not limited to digital signal processors, application specific integrated circuits, field programmable gate arrays, and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for controlling packet transmission among plural nodes, the nodes employing two-way packet relaying in communication among themselves, the method comprising:

based on a set of user traffic-flow demands, determining a network coding (NC)-aware traffic-flow assignment for routing the packet transmission among the nodes in the presence of NC, wherein the NC-aware traffic-flow assignment minimizes a total energy consumption of all the nodes in delivering packets to meet the user traffic-flow demands, and wherein the NC-aware traffic-flow assignment is determined by numerically minimizing an objective function representing the total energy consumption of the nodes under a plurality of constraints, the plurality of constraints including a first constraint that a total energy consumption in transmitting and receiving packets at any node i includes amounts of energy consumed in unicast transmission and in broadcast transmission;

determining a time division multiple access (TDMA)-based media access control (MAC) schedule that minimizes a total number of timeslots required by all the nodes for transmitting the packets while accomplishing the NC-aware traffic-flow assignment; and transmitting and relaying the packets by the nodes according to the NC-aware traffic-flow assignment and the TDMA-based MAC schedule to thereby minimize both the total energy consumption of and the total number of timeslots required by all the nodes for meeting the user traffic-flow demands.

2. The method of claim 1, wherein the plurality of constraints further includes a second constraint that at the node i, a maximum amount of coded traffic $m_i^{\{j_1,j_2\}}$ broadcast on outgoing links $\{j_1, j_2\}$ is less than a total incoming traffic on a link $\overline{j_1}j_2$ or $\overline{j_2}j_1$ where $\overline{j}$ denotes a reverse link of any link j.

3. A wireless network comprising plural nodes, wherein the nodes are collectively configured to employ two-way packet relaying in communication among the nodes, and to control packet transmission among the nodes according to the method of claim 2.

4. The wireless network of claim 3, wherein each of the nodes is a sensor and the sensor is further configured to be wirelessly communicable with another sensor, so that the wireless network forms a wireless sensor network.

5. The method of claim 1, wherein the first plurality of constraints further includes a third constraint that at the node i, a total amount of traffic $m_i^{\{j\}}$ that is unicast on an outgoing link j is the sum of:
 a first amount of traffic that originates at the node i and is transmitted on the outgoing link j; and
 a second amount of incoming traffic sent to the node i and then transmitted on the outgoing link j without coding.

6. A wireless network comprising plural nodes, wherein the nodes are collectively configured to employ two-way packet relaying in communication among the nodes, and to control packet transmission among the nodes according to the method of claim 5.

7. The wireless network of claim 6, wherein each of the nodes is a sensor and the sensor is further configured to be wirelessly communicable with another sensor, so that the wireless network forms a wireless sensor network.

8. A wireless network comprising plural nodes, wherein the nodes are collectively configured to employ two-way packet relaying in communication among the nodes, and to control packet transmission among the nodes according to the method of claim 1.

9. The wireless network of claim 8, wherein each of the nodes is a sensor and the sensor is further configured to be wirelessly communicable with another sensor, so that the wireless network forms a wireless sensor network.

10. A method for controlling packet transmission among plural nodes, the nodes employing two-way packet relaying in communication among themselves, the method comprising:
 based on a set of user traffic-flow demands, determining a network coding (NC)-aware traffic-flow assignment for routing the packet transmission among the nodes in the presence of NC, wherein the NC-aware traffic-flow assignment minimizes a total energy consumption of all the nodes in delivering packets to meet the user traffic-flow demands;
 determining a time division multiple access (TDMA)-based media access control (MAC) schedule that minimizes a total number of timeslots required by all the nodes for transmitting the packets while accomplishing the NC-aware traffic-flow assignment; and
 transmitting and relaying the packets by the nodes according to the NC-aware traffic-flow assignment and the TDMA-based MAC schedule to thereby minimize both the total energy consumption of and the total number of timeslots required by all the nodes for meeting the user traffic-flow demands;
wherein the NC-aware traffic-flow assignment is determined by numerically minimizing an objective function, denoted as $F_1$ and given by $F_1 = \Sigma E_i$ $\forall i \in N$, under a plurality of constraints given by:

$$\sum_{R \in R^k} u_R^k = q_k \ \forall k \in D;$$

$$m_i^{\{j_1, j_2\}} \leq \sum_{k \in D} \sum_{R \in R^k, j_2 \bar{j_1} \in R} u_R^k \ \forall j_1, j_2 \in E^+(i), i \in N;$$

-continued $$m_i^{\{j\}} = \sum_{k \in D, o(k)=i} \sum_{R \in R^k, j \in R} u_R^k + \sum_{j_1 \in E^-(i)} \left[ \sum_{k \in D} \sum_{R \in R^k, j_1 \bar{j} \in R} u_R^k - m_i^{\{j, \bar{j_1}\}} \right]$$

$\forall j \in E^+(i), i \in N;$ $E_i = E_{i(sd)} + E_{i(re)} + E_{i(cd)} \ \forall i \in N;$ $$E_{i(sd)} = \sum_{j \in E^+(i)} (E_e + E_a \cdot d_j^2) \times m_i^j +$$

$$\sum_{\{j_1, j_2\} \in E^+(i)} (E_e + E_a \cdot \max(d_{j_1}, d_{j_2})^2) \times m_i^{\{j_1, j_2\}}$$

$\forall j \in E^+(i), \forall \{j_1, j_2\} \in E^+(i), i \in N;$ $$E_{i(re)} = E_e \cdot \left( \sum_{j \in E^-(i)} m_{i_1: i_1 \in w(j)}^{\{j\}} + \sum_{j_1 \bar{j_2} \in E^-(i)} m_{i_2: i_2 \in w(j_1), w(j_2)}^{\{j_1, j_2\}} \right)$$

$\forall j \in E^-(i), \forall \{j_1, j_2\} \in E^-(i), i \in N;$
and $$E_{i(cd)} = E_c \cdot \left( \sum_{\{j_1, j_2\} \in E^+(i)} m_i^{\{j_1, j_2\}} \right) \forall \{j_1, j_2\} \in E^+(i), i \in N;$$

where:
 $\bar{j}$ denotes a reverse link of any link j;
 k denotes a demand;
 $E_i$ is the energy consumption of a node i selected from the nodes, and $\Sigma E_i$ is the total energy consumption of all the nodes;
 o(k) denotes a source node of the demand k;
 $R^k$ is a set of available paths for the demand k;
 $u_R^k$ is an amount of traffic on any path R for the demand k;
 $q_k$ is an amount of traffic for the demand k;
 $E^+(i)$ is a set of incoming links of the node i;
 $E^-(i)$ is a set of outgoing links of the node i;
 w(j) denotes a transmitting node of any link j;
 $m_i^j$ is a transmitting traffic at the node i on the link j;
 $m_i^{\{j_1, j_2\}}$ is a transmitting traffic at the node i on the link $\{j_1, j_2\}$;
 $d_j$ is a transmitting distance of the link j;
 D is a demands set; and
 N is a nodes set.

11. The method of claim 10, wherein the TDMA-based MAC schedule is determined by determining a state $s = s_1 s_2 \ldots$ in S, a set of all feasible states, such that $t_s$, subject to $$\frac{m_i^j}{v_j} = \sum_{s: s_j = 1} t_s \ \forall j \in V_b,$$

is minimum over all the feasible states in S, where:
 $t_{s'}$ denotes the number of timeslots assigned to a state s' in S;
 $s_j$ in s denotes a state of the link j, where $s_j = 1$ if the link j is active, and $s_j = 0$ if the link j is idle;
 $(s: s_j = 1)$ represents the state s having $s_j = 1$;
 $v_j$ is an effective transmission rate of the link j; and
 $V_b$ denotes a set of both unicast and broadcast links in an entirety of the nodes.

12. A wireless network comprising plural nodes, wherein the nodes are collectively configured to employ two-way packet relaying in communication among the nodes, and to control packet transmission among the nodes according to the method of claim 11.

13. The wireless network of claim 12, wherein each of the nodes is a sensor and the sensor is further configured to be wirelessly communicable with another sensor, so that the wireless network forms a wireless sensor network.

14. A wireless network comprising plural nodes, wherein the nodes are collectively configured to employ two-way packet relaying in communication among the nodes, and to control packet transmission among the nodes according to the method of claim 10.

15. The wireless network of claim 14, wherein each of the nodes is a sensor and the sensor is further configured to be wirelessly communicable with another sensor, so that the wireless network forms a wireless sensor network.

* * * * *